United States Patent
Zhang et al.

(10) Patent No.: US 12,009,948 B2
(45) Date of Patent: Jun. 11, 2024

(54) DATA PROCESSING APPARATUS AND METHOD, BASE STATION, AND STORAGE MEDIUM

(71) Applicant: SANECHIPS TECHNOLOGY CO., LTD, Shenzhen (CN)

(72) Inventors: Dingming Zhang, Shenzhen (CN); Xing Liu, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 61 days.

(21) Appl. No.: 17/781,779

(22) PCT Filed: Sep. 10, 2020

(86) PCT No.: PCT/CN2020/114334
§ 371 (c)(1),
(2) Date: Jun. 2, 2022

(87) PCT Pub. No.: WO2021/109665
PCT Pub. Date: Jun. 10, 2021

(65) Prior Publication Data
US 2023/0024048 A1    Jan. 26, 2023

(30) Foreign Application Priority Data
Dec. 5, 2019   (CN) .......................... 201911235623.6

(51) Int. Cl.
*H04L 25/02* (2006.01)
*H04B 7/0452* (2017.01)
(Continued)

(52) U.S. Cl.
CPC ....... *H04L 25/0242* (2013.01); *H04B 7/0452* (2013.01); *H04B 7/0456* (2013.01); *H04L 5/0051* (2013.01)

(58) Field of Classification Search
CPC . H04L 2025/03414; H04L 2025/03426; H04L 25/0202; H04L 25/0242;
(Continued)

(56) References Cited

U.S. PATENT DOCUMENTS

2008/0240277 A1* 10/2008 Anholt .............. H04L 25/03292
375/262
2011/0058632 A1*  3/2011 Siti  ................... H04L 25/03267
375/340
2017/0070371 A1   3/2017 Liang

FOREIGN PATENT DOCUMENTS

CN           106470054 A     3/2017
CN           111356151 A    12/2018
(Continued)

OTHER PUBLICATIONS

International Search Report for corresponding application PCT/CN2020/114334 filed Sep. 10, 2020; Mail date Dec. 8, 2020.
(Continued)

*Primary Examiner* — Khai Tran
(74) *Attorney, Agent, or Firm* — CANTOR COLBURN LLP (57) ABSTRACT

A data processing apparatus and method, a base station, and a storage medium are provided. The apparatus includes: a processor, configured to determine a computation parallelism degree according to the number of antennas and pilot frequency information, acquire antenna data and channel estimation matrices of respective users, and store the antenna data and the channel estimation matrices in groups in a memory, and determine, according to the computation parallelism degree, target antenna data processed in parallel by an arithmetic unit in a single computation, wherein the target antenna data is part of the antenna data of the respective users; the memory, configured to store the antenna data and the channel estimation matrices in groups,
(Continued)

and output the target antenna data and the channel estimation matrices to the arithmetic unit; and the arithmetic unit, configured to compute user data based on the target antenna data and the channel estimation matrices.

20 Claims, 6 Drawing Sheets

(51) Int. Cl.
  *H04B 7/0456* (2017.01)
  *H04L 5/00* (2006.01)
(58) Field of Classification Search
  CPC ........ H04L 25/03184; H04L 25/03292; H04B 7/0413; H04B 7/0452; H04B 7/0456; H04W 24/02
  USPC ......................................... 375/260, 262, 267
  See application file for complete search history.

(56) References Cited

FOREIGN PATENT DOCUMENTS

| | | |
|---|---|---|
| CN | 109271138 A | 1/2019 |
| CN | 111356151 A | 6/2020 |
| WO | 2018184211 A1 | 10/2018 |

OTHER PUBLICATIONS

European Search Report for corresponding application EP20896872, Report dated Dec. 8, 2022.

Qing Yang, "BigStation: enabling Scalable Real-time Signal Processing in Large MU-MIMO Systems", Sigcomm, Aug. 27, 2013, pp. 399-410, XP058030633.

* cited by examiner

DATA PROCESSING APPARATUS AND METHOD, BASE STATION, AND STORAGE MEDIUM

CROSS REFERENCE

This application is a National Stage Filing of the PCT International Application No. PCT/CN2020/114334 filed on Sep. 10, 2020, which claims priority to Chinese Application No. 201911235623.6 filed on Dec. 5, 2019, the entirety of which is herein incorporated by reference.

TECHNICAL FIELD

The present disclosure relates to wireless communication networks, and in particular to a data processing apparatus and method, a base station, and a storage medium.

BACKGROUND

Massive MIMO (Massive antenna technology, also known as Large Scale MIMO) is a key technology for improving system capacity and spectrum utilization rate in the fifth-generation of mobile communications (5G). Due to the application of the Massive MIMO technology, a communication bandwidth in a 5G scenario increases exponentially. For example, as far as a single 5G device (a single base station or a single terminal) is concerned, its spectral bandwidth has increased by several times to dozens of times compared with a single Long Time Evolution (LTE) device, and antenna data has also increased by several times to dozens of times, thus achieving an increase in a communication bandwidth by dozens or even hundreds of times. Therefore, the computation scale of matrix computations involved in the Massive MIMO technology is also extremely large, and accordingly the computation mode in the related art cannot satisfy the above computation requirements.

SUMMARY

Embodiments of the present disclosure provide a data processing apparatus and method, a base station, and a storage medium.

The embodiments of the present disclosure provide a data processing apparatus, including: a processor, configured to determine a computation parallelism degree according to the number of antennas and pilot frequency information, acquire antenna data and channel estimation matrices of respective users, store the antenna data and the channel estimation matrices in groups in a memory, and determine, according to the computation parallelism degree, target antenna data processed in parallel by an arithmetic unit in a single computation, wherein the target antenna data is part of the antenna data of the respective users; the memory, configured to store the antenna data and the channel estimation matrices in groups, and output the target antenna data and the channel estimation matrices to the arithmetic unit; and the arithmetic unit, configured to compute user data based on the target antenna data and the channel estimation matrices.

The embodiments of the present disclosure provide a data processing method, including: determining a computation parallelism degree according to the number of antennas and pilot frequency information; acquiring antenna data and channel estimation matrices of respective users, and storing the antenna data and the channel estimation matrices in groups; determining, according to the computation parallelism degree, target antenna data processed in parallel in a single computation, wherein the target antenna data is part of the antenna data of the respective users; and computing user data based on the target antenna data and the channel estimation matrices.

The embodiments of the present disclosure provide a base station, wherein the base station includes any data processing apparatus in the embodiments of the present disclosure.

The embodiments of the present disclosure provide a storage medium, wherein computer programs are stored in the storage medium, and when executed by a processor, the computer programs implement any method in the embodiments of the present disclosure.

With regard to the above embodiments and other aspects of the present disclosure, as well as implementations thereof, further explanation is provided in Brief Description of the Drawings, Detailed Description and Claims.

DETAILED DESCRIPTION

In order to make the objectives, technical solutions and advantages of the present disclosure clearer, the embodiments of the present disclosure will be described in detail below in combination with the drawings. It should be noted that, the embodiments in the present disclosure and the features in the embodiments can be arbitrarily combined with each other in the case of no conflict.

Figure 1:
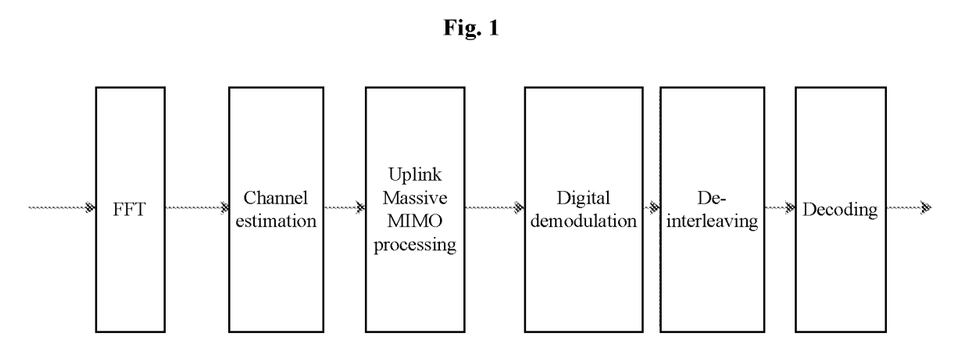
FIG. 1 is a schematic diagram of the operating process of an uplink Massive MIMO.

FIG. 1 is a schematic diagram of the operating process of an uplink Massive MIMO. As shown in FIG. 1, a base station acquires uplink pilot frequency information of a user terminal (also referred to as User Equipment (UE)), and performs channel estimation according to the uplink pilot frequency information to acquire spatial channel information between an antenna and the UE, wherein the spatial channel information is expressed by a channel estimation matrix W. The uplink Massive MIMO processing includes:

performing matrix computation based on the channel estimation matrix and an antenna data matrix to acquire originally transmitted user data; and then, performing digital demodulation, de-interleaving, decoding and other processing on the user data.

The matrix computation expression of the uplink Massive MIMO processing is as follows:

$$\begin{bmatrix} din_{0,0} & din_{0,1} & \ldots & din_{0,k-1} \\ din_{1,0} & din_{1,1} & \ldots & din_{1,k-1} \\ \ldots & \ldots & \ldots & \ldots \\ din_{m-1,0} & din_{m-1,1} & \ldots & din_{m-1,k-1} \end{bmatrix} \times \begin{bmatrix} W_{0,0} & W_{0,1} & \ldots & W_{0,l-1} \\ W_{1,0} & W_{1,1} & \ldots & W_{1,l-1} \\ \ldots & \ldots & \ldots & \ldots \\ W_{k-1,0} & W_{k-1,1} & \ldots & W_{k-1,l-1} \end{bmatrix} =$$

$$\begin{bmatrix} dout_{0,0} & dout_{0,1} & \ldots & dout_{0,l-1} \\ dout_{1,0} & dout_{1,1} & \ldots & dout_{1,l-1} \\ \ldots & \ldots & \ldots & \ldots \\ dout_{m-1,0} & dout_{m-1,1} & \ldots & dout_{m-1,l-1} \end{bmatrix}$$

wherein din represents the antenna data matrix, m represents the number of sub-carriers in a bandwidth, and k represents the number of antennas; l represents the number of users. In LTE and 5G systems, resources are allocated in a unit of Resource Block (RB), each RB includes 12 Resource Elements (REs), each RE corresponds to one sub-carrier, and the data of different RBs needs to be multiplied by different W matrices to generate different beam directions. Assuming that there are N RBs, the antenna data of $RB_n$ is $S_n$, and the channel estimation matrix is $W_n$, then a user matrix $A_n$ including user data can be expressed as $A_n = S_n \times W_n$, wherein $0 \leq n \leq N-1$.

Taking one RB as an example, the above matrix computation can be transformed into:

$$\begin{bmatrix} din_{0,0} & din_{0,1} & \ldots & din_{0,k-1} \\ din_{1,0} & din_{1,1} & \ldots & din_{1,k-1} \\ \ldots & \ldots & \ldots & \ldots \\ din_{11,0} & din_{11,1} & \ldots & din_{11,k-1} \end{bmatrix} \times \begin{bmatrix} W_{0,0} & W_{0,1} & \ldots & W_{0,l-1} \\ W_{1,0} & W_{1,1} & \ldots & W_{1,l-1} \\ \ldots & \ldots & \ldots & \ldots \\ W_{k-1,0} & W_{k-1,1} & \ldots & W_{k-1,l-1} \end{bmatrix} =$$

$$\begin{bmatrix} dout_{0,0} & dout_{0,1} & \ldots & dout_{0,l-1} \\ dout_{1,0} & dout_{1,1} & \ldots & dout_{1,l-1} \\ \ldots & \ldots & \ldots & \ldots \\ dout_{11,0} & dout_{11,1} & \ldots & dout_{11,l-1} \end{bmatrix}$$

wherein k represents the number of antennas; and l represents the number of users. The multiplier is an antenna data matrix S with the size of 12*k, which represents an antenna data matrix with 12 rows (i.e., one RB) and k columns. The multiplicand is a channel estimation matrix W with the size of k*l, which represents a matrix of weight data with k rows and l columns. The matrix computation result is a user matrix A with the size of 12*l, which represents a matrix of user data with 12 rows (i.e., one RB) and l columns. The channel estimation matrixes corresponding to respective RBs are different. For example, the matrix computation result of the first row of the antenna data matrix and the first column of the channel estimation matrix is computed to acquire an RE0 of a user 0, that is, $din_{0,0} \times W_{0,1} + din_{0,1} \times W_{1,1} + \ldots + din_{0,k-1} = dout_{0,1}$. The matrix computation result of the first row of the antenna data matrix and the second column of the channel estimation matrix is computed to acquire the RE0 of a user 1, that is, $din_{0,0} \times W_{0,1} + din_{0,1} \times W_{1,1} + \ldots + din_{0,k-1} \times W_{k-1,1} = dout_{0,1}$. Similar computation is performed through iteration till RE0 of all users is acquired. Further, the matrix computation result of the second row of the antenna data matrix and the first column of the channel estimation matrix is computed to acquire an RE1 of the user 0. The matrix computation result of the second row of the antenna data matrix and the second column of the channel estimation matrix is computed to acquire the RE1 of the user 1. Similar computation is performed through iteration till the RE1 of all users is acquired. Similar computation is performed through iteration till an RE2 to an RE11 of all users are computed, which will not be listed one by one in the embodiments of the present disclosure.

In a 5G scenario, the computation scale of the above matrix computation is much greater than that in an LTE scenario. For example, taking a scenario with 4 users and 8 antennas in a typical LTE system and a scenario with 32 users and 64 antennas in a typical 5G system as an example, the computation amount of uplink Massive MIMO frequency domain data processing is compared. The computation amount of the 5G system for computing each sub-carrier is (32×64)/(4×8)=64 times of the computation amount of the LTE system for computing each sub-carrier. In addition, the bandwidth of the typical 5G system is 100M, and the bandwidth of the typical LTE system is 20M, so the bandwidth of the typical 5G system is 5 times of the bandwidth of the typical LTE system. Therefore, in the uplink Massive MIMO frequency domain data processing, the computation density of the typical 5G system is 64×5=320 times of the computation density of the typical LTE system.

The performance required by a typical 5G system is: all data of 32 users, 64 antennas and 100M bandwidth is processed within one symbol, the computation amount of one symbol is 273*64*32*12=6394752 complex multiplications (assuming that the maximum number of RBs of the 100M bandwidth is 273, 1RB=12RE). Since one symbol lasts for 35.4 microseconds, the computation parallelism degree is 6394752/35.4 complex multiplication computation amounts/microseconds=180 complex multiplication computation amounts/nanoseconds, that is, 180×4=720 scalar multiplications need to be completed per nanosecond. While the typical LTE system only needs to complete 720/320=3 scalar multiplications per nanosecond.

To sum up, it can be seen that the frequency domain data processing of the typical LTE system has low parallelism degree and low implementation complexity, and does not occupy a large amount of computation resources. However, in the frequency domain data processing of the typical 5G system, the parallelism capability and computation density required by the computation are much higher than those in the typical LTE system. Therefore, it is an urgent problem to provide a data processing solution with a high processing parallelism degree.

Figure 2:
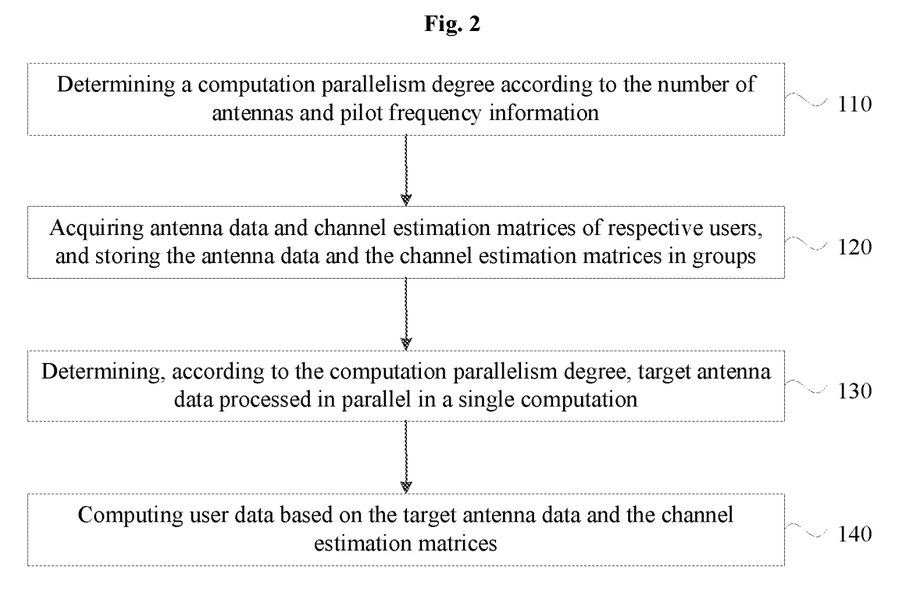
FIG. 2 is a flow diagram of a data processing method provided by the embodiments of the present disclosure.

FIG. 2 is a flow diagram of a data processing method provided by the embodiments of the present disclosure. The method can be executed by a data processing apparatus, the apparatus may be implemented by software and/or hardware, and is usually arranged in a base station. As shown in FIG. 2, the method includes the following operations.

At 110, a computation parallelism degree is determined according to the number of antennas and pilot frequency information.

At 120, antenna data and channel estimation matrices of respective users are acquired, and the antenna data and the channel estimation matrices are stored in groups.

At 130, target antenna data processed in parallel in a single computation is determined according to the computation parallelism degree, wherein the target antenna data is part of the antenna data.

At 140, user data is computed based on the target antenna data and the channel estimation matrices.

It should be noted that, there is no sequence between the operation 110 and the operation 120, the operation 110 can be executed at first, and then the operation 120 is executed, or, the operation 120 can be executed at first, and then the operation 110 is executed, or the two operations are executed in parallel or interspersed, which is not limited in the embodiments of the present disclosure.

In the embodiments of the present disclosure, the number of antennas is a kind of configuration information of the antennas. After the base station is arranged, the configuration information of the antennas is fixed. For example, the number of antennas can be acquired by reading a relevant configuration file of the base station.

The pilot frequency information is used for determining spatial channel information between the antenna and the UE. The UE sends the pilot frequency information to the base station, and the base station parses the pilot frequency information to acquire the spatial channel information between the antenna and the UE, that is, the channel estimation matrix. Therefore, the channel estimation matrices corresponding to respective UEs are different. It should be noted that, for different pilot frequency information, the computation granularity or complexity of the matrix computation between the antenna data and the channel estimation matrices is also different.

In the embodiments of the present disclosure, estimation accuracy of the channel estimation matrices can be determined according to the pilot frequency information. The estimation accuracy can be represented by the number of weight data corresponding to each RB of each user, that is, the data in the channel estimation matrix is the weight data corresponding to each RE in each RB. For example, it may be set that the weight data of 12 REs included in each RB is the same, and then each RB corresponds to one group of weight data. Or, one group of weight data is configured for each RE, and then each RB corresponds to 12 groups of weight data. Or, one group of weight data is configured for every 2 REs, and then each RB corresponds to 6 groups of weight data. Or, one group of weight data is configured for every 3 REs, and then each RB corresponds to 4 groups of weight data. Or, one group of weights is configured for every 4 REs, and then each RB corresponds to 3 groups of weighted data. Or, one group of weight data is configured for every 6 REs, and then each RB corresponds to 2 groups of weight data. It should be noted that, the greater the number of weight data corresponding to each RB is, the better the effect of channel estimation is, but the greater the computation amount is.

In the embodiments of the present disclosure, the computation parallelism degree can be understood as the number of REs in each RB of each user that is processed in parallel in each iterative computation, and accordingly, the target antenna data processed in parallel in a single computation can be determined based on the computation parallelism degree. Taking the 32 users, 64 antennas and 100M bandwidth of the typical 5G system as an example, the computation amount of each RE of each user of each symbol is 64 complex multiplication computations. Therefore, in order to meet the requirements of 180 computation amounts/nanoseconds, it is necessary to compute 180÷64≈3 REs per nanosecond. If the clock cycle is 1 GHz, the computation of 3 REs needs to be completed within each clock cycle, that is, the computation parallelism degree of each complex multiplication computation is 3.

Exemplarily, one implementation is to compute the same RE of 3 users in parallel, that is, acquire the same row from the antenna data matrix, and acquire 3 columns from the channel estimation matrix, so as to perform matrix computation to acquire 3 columns of data in the same row of the user matrix.

The other implementation is to compute 3 REs of the same user in parallel, that is, acquire 3 rows from the antenna matrix, and acquire 1 column from the channel estimation matrix, so as to perform the matrix computation to acquire 3 rows of data in the same column of the user matrix.

Figure 3:
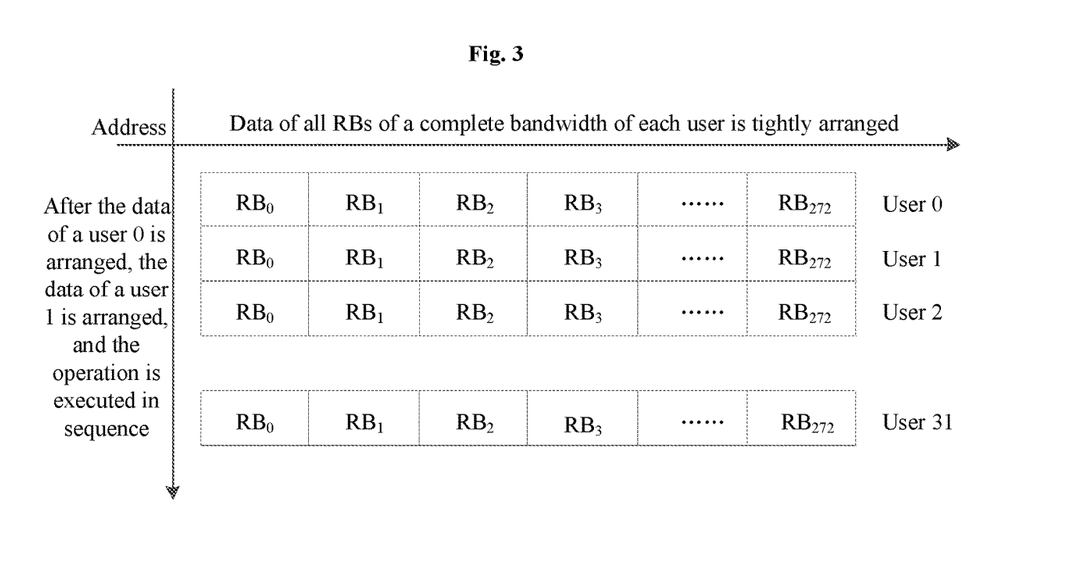
FIG. 3 is a schematic diagram of a data format of user data in a memory provided by the embodiments of the present invention.

FIG. 3 is a schematic diagram of a data format of user data in a memory provided by the embodiments of the present invention. As shown in FIG. 3, it is assumed that all RB data of each user in the entire bandwidth is required to be continuously stored. It should be noted that, the data format in FIG. 3 is only an example of a storage manner of user data, but not a limitation.

If the first implementation solution is utilized, 3 REs output at the same time are stored on different addresses, 3 writing commands need to be issued to complete a parallel output, and the data output by each writing command is very small, resulting in a very low interface bandwidth utilization rate. To avoid this problem, it is necessary to cache the data of all users to a certain data size, and output the data according to the following order: outputting the data of the first user in a reverse order, and then outputting the data of the second user. However, in order to satisfy the requirements of caching the data of all users, it is necessary to prepare an enough storage space, thereby increasing the implementation cost.

If the second implementation solution is utilized, the 3 REs output at the same time belong to the same user. Since the 3 REs are already stored continuously, a parallel output can be completed by issuing only one writing command. Therefore, the interface bandwidth utilization rate can be guaranteed. In one case, since the matrix is computed in a unit of RB, if the weights of the 12 REs of each RB of each user are the same, the computation of 1 RB of the antenna can be completed within four consecutive clock cycles, and by issuing one writing command, all the data of this RB can be output, thus further improving the interface utilization rate.

Taking the second implementation solution as an example for illustration, within one clock cycle, RE0-RE2 in the first RB of the first user are processed in parallel, and the matrix computation expression is as follows:

$$\begin{bmatrix} din_{0,0} & din_{0,1} & \ldots & din_{0,k-1} \\ din_{1,0} & din_{1,1} & \ldots & din_{1,k-1} \\ din_{2,0} & din_{2,1} & \ldots & din_{2,k-1} \end{bmatrix} \times \begin{bmatrix} W_{0,x} \\ W_{1,x} \\ \ldots \\ W_{k-1,x} \end{bmatrix} = \begin{bmatrix} dout_{0,x} \\ dout_{1,x} \\ dout_{2,x} \end{bmatrix}.$$

Within the next adjacent clock cycle, RE3-RE5 in the first RB of the first user are processed in parallel, and the matrix computation expression is as follows:

$$\begin{bmatrix} din_{3,0} & din_{3,1} & \ldots & din_{3,k-1} \\ din_{4,0} & din_{4,1} & \ldots & din_{4,k-1} \\ din_{5,0} & din_{5,1} & \ldots & din_{5,k-1} \end{bmatrix} \times \begin{bmatrix} W_{0,x} \\ W_{1,x} \\ \ldots \\ W_{k-1,x} \end{bmatrix} = \begin{bmatrix} dout_{3,x} \\ dout_{4,x} \\ dout_{5,x} \end{bmatrix}.$$

Within the next adjacent clock cycle, RE6-RE8 in the first RB of the first user are processed in parallel, and the matrix computation expression is as follows:

$$\begin{bmatrix} din_{6,0} & din_{6,1} & \cdots & din_{6,k-1} \\ din_{7,0} & din_{7,1} & \cdots & din_{7,k-1} \\ din_{8,0} & din_{8,1} & \cdots & din_{8,k-1} \end{bmatrix} \times \begin{bmatrix} W_{0,x} \\ W_{1,x} \\ \cdots \\ W_{k-1,x} \end{bmatrix} = \begin{bmatrix} dout_{6,x} \\ dout_{7,x} \\ dout_{8,x} \end{bmatrix}.$$

Within the next adjacent clock cycle, RE9-RE11 in the first RB of the first user are processed in parallel, and the matrix computation expression is as follows:

$$\begin{bmatrix} din_{9,0} & din_{9,1} & \cdots & din_{9,k-1} \\ din_{10,0} & din_{10,1} & \cdots & din_{10,k-1} \\ din_{11,0} & din_{11,1} & \cdots & din_{11,k-1} \end{bmatrix} \times \begin{bmatrix} W_{0,x} \\ W_{1,x} \\ \cdots \\ W_{k-1,x} \end{bmatrix} = \begin{bmatrix} dout_{9,x} \\ dout_{10,x} \\ dout_{11,x} \end{bmatrix}.$$

After the first RB of the first user is processed, the first RB of the second user is processed in the same manner, and similar processing is performed through iteration to acquire the first RBs of all users. The data of the second RBs of all users is computed in the same manner; and similar processing is performed through iteration to acquire the data of all RBs of all users.

Or, within one clock cycle, RE0-RE2 in the first RBs of all users are processed in parallel; within the next adjacent clock cycle, RE3-RE5 in the first RBs of all users are processed in parallel; within the next adjacent clock cycle, RE6-RE8 in the first RBs of all users are processed in parallel; and within the next adjacent clock cycle, RE9-RE11 in the first RBs of all users are processed in parallel. The data of the second RBs of all users is computed in the same manner, and similar processing is performed through iteration to acquire the data of all RBs of all users.

In one example, determining the computation parallelism degree according to the number of antennas and the pilot frequency information may be implemented in the following manners.

The computation parallelism degree is determined according to the number of antennas. For example, when the number of antennas is decreased, in order to increase the bandwidth supported by the present method and compute more REs at one time, and in order to reduce the complexity of physical implementation, only the parallelism of 3 RE/6 RE is considered in the example. That is, in the case of 33-64 antennas, the user data is computed in parallel with a step length of 3 RE; and in the case of 1-32 antennas, the user data is computed in parallel with a step length of 6 RE. It should be noted that, the difference in the computation parallelism degrees of the uplink Massive MIMO matrix computation resulted from different numbers of antennas does not affect the innovation and protection scope of the present disclosure.

Or, it is also possible to determine estimation accuracy of the channel estimation matrices according to the pilot frequency information, and determine the computation parallelism degree according to the estimation accuracy. For example, when each RB corresponds to 12 groups of weight data, the computation parallelism degree is 1 RE. Or, when each RB corresponds to 6 groups of weight data, the computation parallelism degree is 2 RE. Or, when each RB corresponds to 4 groups of weight data, the computation parallelism degree is 3 RE. Or, when each RB corresponds to 3 groups of weight data, the computation parallelism degree is 4 RE. Or, when each RB corresponds to 2 groups of weight data, the computation parallelism degree is 6 RE.

It should be noted that, the difference in the computation parallelism degrees of the uplink Massive MIMO matrix computation resulted from different pilot frequency information does not affect the innovation and protection scope of the present disclosure.

Or, a first reference computation parallelism degree is determined according to the number of antennas; a second reference computation parallelism degree is determined according to the pilot frequency information; and a smaller one of the first reference computation parallelism degree and the second reference computation parallelism degree is used as the computation parallelism degree. It can be understood that, there are many manners to determine the computation parallelism degree, and the above is only an example, not a limitation.

In one example, once being read, the antenna data of one RB is cached in the memory. Correspondingly, the weight data in the channel estimation matrix corresponding to the RB is read and cached in the memory, and then matrix computation is performed. After the computation of the first RB of the first user is completed, the first RB of the second user is computed, and similar computation is performed through iteration to acquire all RBs of all users without repeatedly reading the antenna data matrix, such that bandwidth waste and power consumption can be avoided.

In one example, several RBs are defined as one BLOCK, the computation of one BLOCK of one user is first read and completed, and then the computation of the BLOCKs of other users is completed in sequence. The greater the BLOCK is, the more storage resources are consumed, but the higher the interface utilization rate is. In the embodiments of the present disclosure, the BLOCK size that can be set includes 1 RB, 2 RB, 4 RB, 8 RB and 16 RB. Specifically, the BLOCK size is pre-configured, and the maximum number of RBs included in one BLOCK is determined by the number of antennas. It should be noted that, according to the number of RBs of each user in the entire bandwidth and the BLOCK size, the number of BLOCKS in the entire bandwidth can be determined. A product of the number of BLOCKs and a processing delay time needs to be less than a symbol time, wherein the processing delay time is a time difference between a read-in operation starting moment of the antenna data and a write-out operation starting moment of the user data. The processing delay time can be determined according to the number of users, the bandwidth, the number of antennas, and a present number of resource blocks. It should be noted that, the processing delay time can also be configured manually, which is not specifically limited in the embodiments of the present disclosure.

Figure 4:
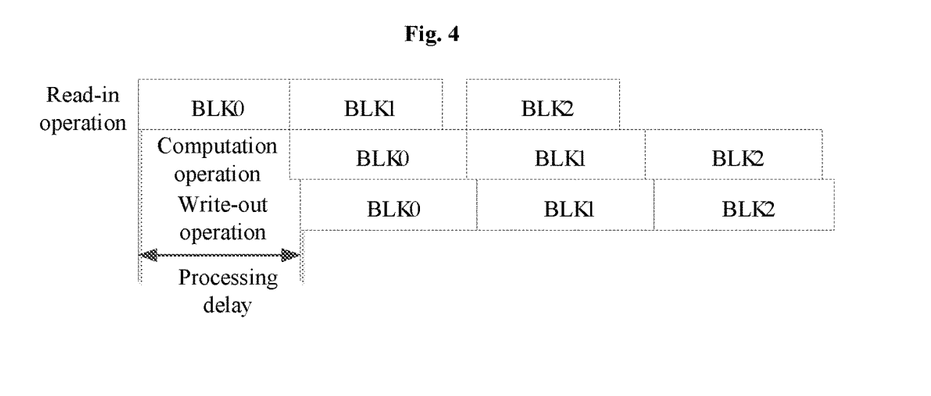
FIG. 4 is a schematic diagram of a processing flow of data processing in a BLOCK manner provided by the embodiments of the present disclosure.

FIG. 4 is a schematic diagram of a processing flow of data processing in a BLOCK manner provided by the embodiments of the present disclosure. As shown in FIG. 4, the time difference between the read-in operation starting moment and the write-out operation starting moment of one BLOCK is the processing delay time, wherein the antenna data and the weight data are read in, and the user data is written. In this way, the processing delay is reduced from a symbol level to a BLOCK level, and a segmented data size is read within a segmented time, which is beneficial for the uniformity of the interface bandwidth.

In one example, acquiring the antenna data and the channel estimation matrices of the respective users, and storing the antenna data and the channel estimation matrices in the memory may include: reading, in segments, the antenna data and weight data in the channel estimation matrices according to a preset number of resource blocks, and caching the antenna data and the weight data. For example, each segment of data corresponds to the data of one BLOCK, and one BLOCK includes one or more RBs (i.e., one or more resource blocks).

Figure 5:
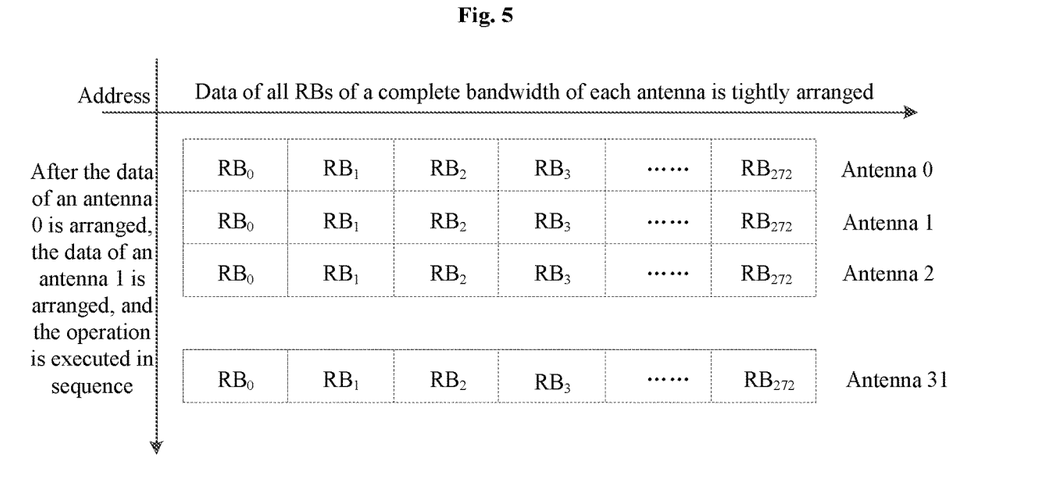
FIG. 5 is a schematic diagram of a data format of antenna data in an external memory provided by the embodiments of the present disclosure.

FIG. 5 is a schematic diagram of a data format of antenna data in an external memory provided by the embodiments of the present disclosure. According to the data format of the antenna data shown in FIG. 5, the data of one BLOCK of an antenna 0 (e.g., RE0-RE2) is read, the data of one BLOCK of an antenna 1 (e.g., RE0-RE2) is read, and similar processing is performed through iteration to read the data of one BLOCK of all antennas. The data of one BLOCK of the antenna 0 (e.g., RE3-RE5) is continuously read, the data of one BLOCK of the antenna 1 (e.g., RE3-RE5) is continuously read, and so on, until the data of all BLOCKs of all antennas is read. It should be noted that, the data format in FIG. 5 is only an example of a storage manner of the antenna data, but not a limitation.

Figure 6:
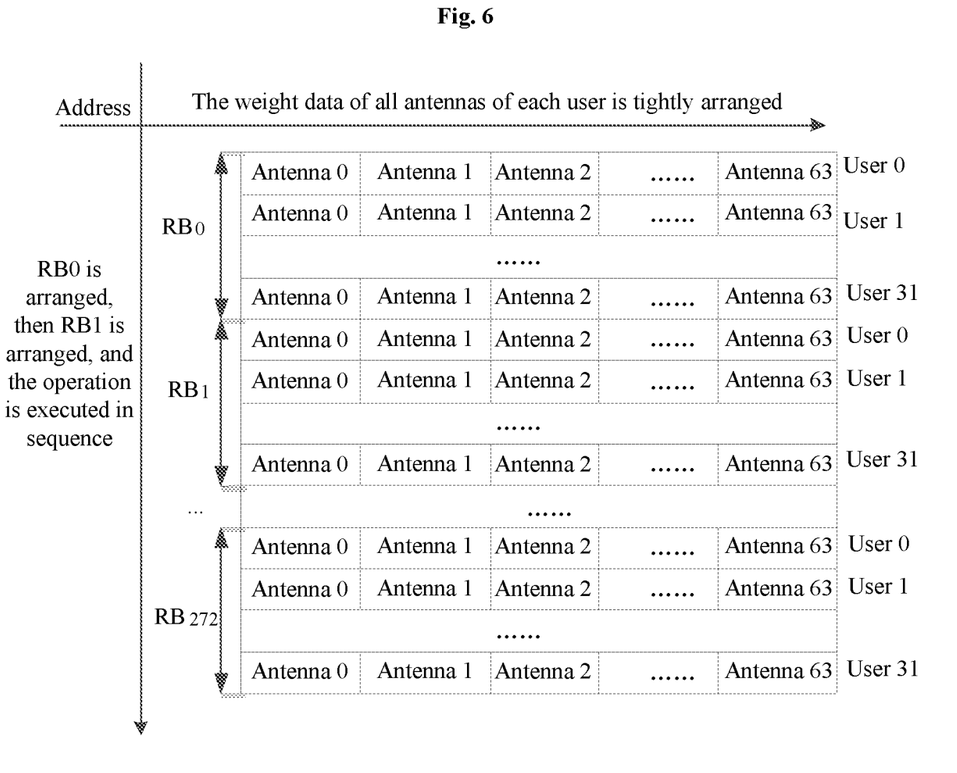
FIG. 6 is a schematic diagram of a data format of weight data in channel estimation matrices in an external memory provided by the embodiments of the present disclosure.

FIG. 6 is a schematic diagram of a data format of weight data in channel estimation matrices in an external memory provided by the embodiments of the present disclosure. According to the data format of the weight data shown in FIG. 6, the weight data of all antennas of all users of the RB0 is read, the weight data of all antennas of all users of the RB1 is read, and similar processing is performed through iteration to acquire the weight data of all RBs in one BLOCK. It should be noted that, the data format in FIG. 6 is only an example of a storage manner of the weight data, but not a limitation.

In one example, storing the antenna data and the weight data in the memory may include: grouping the antenna data and the weight data based on a preset grouping storage rule, and storing the antenna data and the weight data in an associated manner based on a grouping result, thereby avoiding the problem that a circuit crossover in direct computation increases the wiring difficulty of a circuit design. The preset grouping storage rule is formulated in consideration of the number of antennas and the layout and wiring of the circuit design.

Exemplarily, in a 5G scenario with 32 users and 64 antennas, in order to achieve the 100M bandwidth, 64×3=192 groups of complex multipliers are used in the embodiments of the present disclosure, and one group of complex multipliers corresponds to 4 groups of real number multipliers, therefore, 192×4=768 groups of real number multipliers are used in the embodiments of the present disclosure. Assuming that real parts and imaginary parts of the antenna data and the weight data are both 16 bits, and the input of each group of multipliers is 16×16, such a massive matrix computation will inevitably introduce more connecting lines and crossovers, thereby increasing the layout and wiring difficulty of the circuit design. It can also be seen from the matrix computation formula that, the output data of each user is directly associated with the input data of each antenna, so there are many crossover connecting lines. In the embodiments of the present disclosure, according to the characteristics of 5G frequency domain data storage and Massive MIMO computation, streamline processing is performed on the 192 groups of complex multiplication computations in a grouping manner. Every 3 REs of 16 antennas are taken as a group, there are a total of 4 groups, and the grouping rule is as follows:

grp$_{i,j}$, wherein i={ant$_{0-15}$, ant$_{16-31}$, ant$_{32-47}$, ant$_{48-63}$}, j={RE$_{0-2}$, RE$_{3-5}$ or RE$_{6-8}$, RE 9$_{-11}$}. Matrix computations are performed in groups to acquire the user data.

Exemplarily, for an application scenario with 64 antennas and a computation parallelism degree of 3, every 16 antennas can be taken as a group, and each group includes 3 REs. Taking the first group as an example, the antennas ant$_{0-15}$ and RE0-RE2 of each antenna form a group, which is named as an antenna data group 0, or is called an antenna group 0 for short. For RE0, 16 antennas have 16 pieces of weight data, which can be divided into 2 weight groups, that is, one antenna group and two weight groups form one group, and the antenna data and the weight data are relevantly stored in groups.

Figure 7:
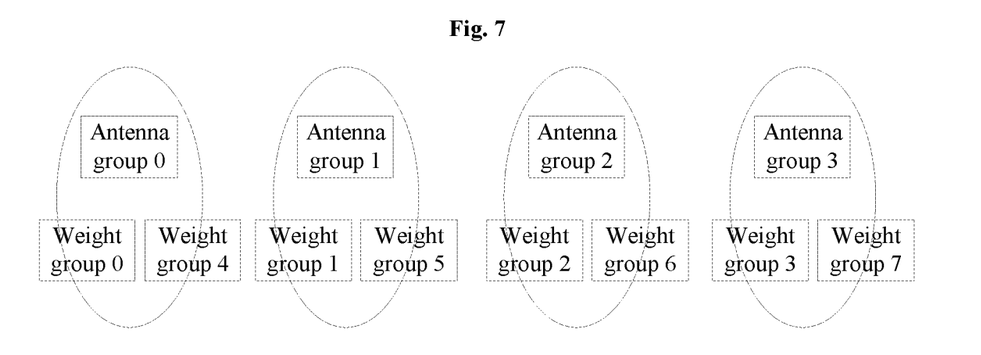
FIG. 7 is a schematic diagram of grouping of antenna data and weight data provided by the embodiments of the present disclosure.

FIG. 7 is a schematic diagram of grouping of antenna data and weight data provided by the embodiments of the present disclosure. As shown in FIG. 7, ant$_{0-15}$ are marked as the antenna group 0, and value data corresponding to the antenna group 0 is stored by two weight groups, that is, the antenna group 0, a weight group 0 and a weight group 4 are taken as a group for storage. Similarly, ant$_{16-31}$ are marked as an antenna group 1, and the antenna group 1, a weight group 1 and a weight group 5 are taken as a group for storage. Similarly, ant$_{32-47}$ are marked as an antenna group 2, and the antenna group 2, a weight group 2 and a weight group 6 are taken as a group for storage. Ant$_{48-63}$ are marked as an antenna group 3, and the antenna group 3, a weight group 3 and a weight group 7 are taken as a group for storage.

It should be noted that, the above grouping examples are not limited, and new grouping manners will appear as the number of antennas changes.

In one example, determining, according to the computation parallelism degree, the target antenna data processed in parallel in the single computation includes: determining, according to the computation parallelism degree, the number of resource elements of a single user acquired after the single computation; and determining, according to the number of resource elements, the target antenna data processed in parallel in the single computation. As an exemplary implementation, a data reading command is generated based on the target antenna data, and the data reading command is sent to the memory, wherein the data reading command is used for instructing the memory to output the target antenna data and the weight data corresponding to the target antenna data to the arithmetic unit. For example, taking the computation parallelism degree of 2 as an example, for RE0-RE2 of the user 0, the target antenna data is the antenna data of RE0-RE2 corresponding to the antenna group 0, the weight data corresponds to the antenna data, then the processor generates the data reading command, and sends the data reading command to the memory, so that the memory reads the data corresponding to the antenna group 0, the weight group 0 and the weight group 4, and sends the data corresponding to the antenna group 0, the weight group 0 and the weight group 4 to the arithmetic unit.

Figure 8:
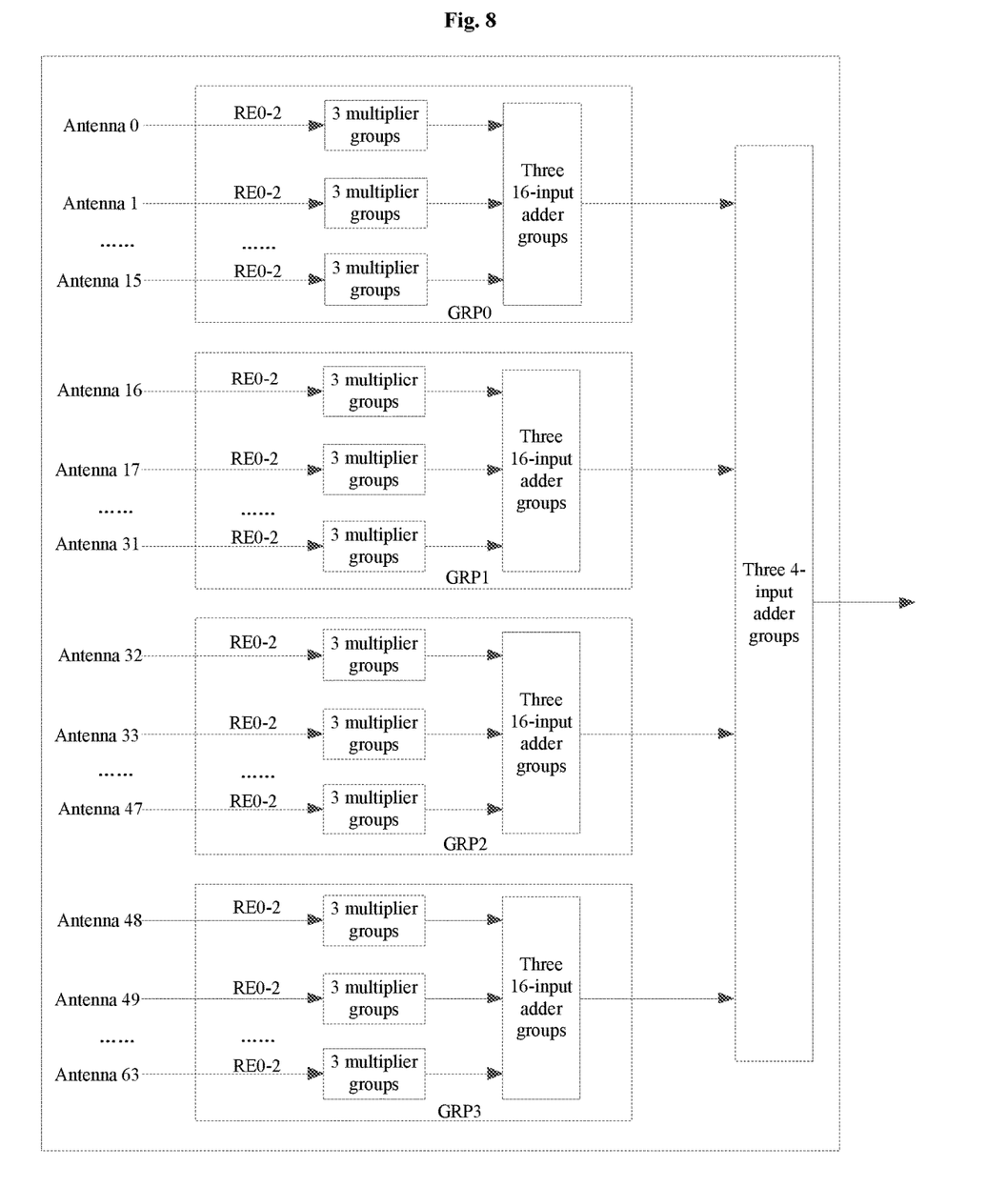
FIG. 8 is a schematic diagram of computation of user data provided by the embodiments of the present disclosure.

FIG. 8 is a schematic diagram of computation of user data provided by the embodiments of the present disclosure. As shown in FIG. 8, GRP0-GRP4 correspond to the above four antenna groups, including nine multiplier groups, three 16-input adder groups, and three 4-input adder groups. Taking GRP0 as an example, each multiplier group is used for processing the multiplication computation of one RE, outputting a computation result to the 16-input adder group, performing an addition computation by means of the 16-input adder group, and outputting an addition computation result to the three 4-input adders, and the computation result of the 4-input adder is the user data of RE0-RE2 of the antenna group 0. By means of the GRP0-GRP4, the multiplication computation of the antenna data and the weight data in the group is realized, then the sum of all multiplication results in the group is computed, and then the sums in all groups are added to acquire the user data of RE0-RE2 of all antennas.

By grouping the antenna data and the weight data, the connecting line crossovers are reduced, the direct computation between the data in the groups is avoided, thereby avoiding massive connecting line crossovers between the groups. After the data in the group is aggregated and computed to acquire small bit-width data, and after each group acquires 3 REs, the group is computed with other groups, there is crossover computation of only 3 REs between the groups, thereby greatly reducing the jamming degree of the connecting lines, and reducing the risks of rear-end implementation. In order to reduce the data crossover between an arithmetic unit and an input cache, input data caches are also grouped.

By means of determining the computation parallelism degree according to the number of antennas and the pilot frequency information, determining, according to the computation parallelism degree, the target antenna data processed in parallel in the single computation, and performing the matrix computation on the target antenna data and the channel estimation matrix to implement the parallel processing of the antenna data, the embodiments of the present disclosure improve the parallelism degree of data processing in the base station, have the characteristics of high parallelism degree and low delay, and meet the computation requirements of the matrix computations.

In some examples, data read-in, computation and write-out operations are performed in the BLOCK manner, so that the processing delay can be reduced from the symbol level to the BLOCK level, and a segmented data size is read within a segmented time, which is beneficial for the uniformity of the interface bandwidth.

In some examples, by grouping the antenna data and the weight data, outflow processing is performed on the complex multiplication computations in the computation, the connecting line crossovers in the circuit design are reduced, the direct computation between the data in the groups is avoided, thereby avoiding massive connecting line crossovers between the groups, and reducing the jamming degree of the connecting lines.

Figure 9:
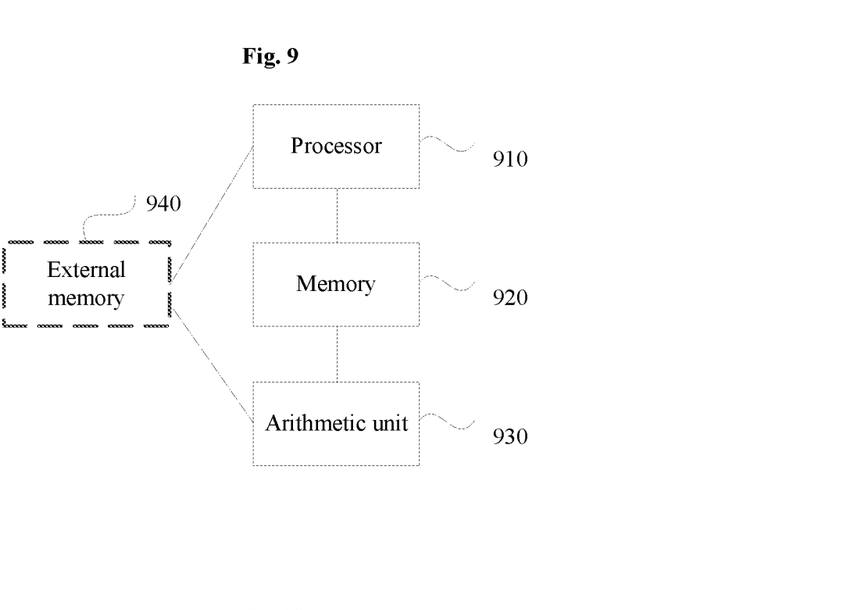
FIG. 9 is a structural block diagram of a data processing apparatus provided by the embodiments of the present disclosure.

FIG. 9 is a structural block diagram of a data processing apparatus provided by the embodiments of the present disclosure. The apparatus improves the parallelism degree of data processing in a base station by executing the data processing method provided by the embodiments of the present disclosure. As shown in FIG. 9, the apparatus includes:
  a processor 910, configured to determine a computation parallelism degree according to the number of antennas and pilot frequency information, acquire antenna data and channel estimation matrices of respective users, store the antenna data and the channel estimation matrices in groups in a memory, and determine, according to the computation parallelism degree, target antenna data processed in parallel by an arithmetic unit in a single computation, wherein the target antenna data is part of the antenna data of the respective users;
  the memory 920, configured to store the antenna data and the channel estimation matrices in groups, and output the target antenna data and the channel estimation matrices to the arithmetic unit; and
  the arithmetic unit 930, configured to compute user data based on the target antenna data and the channel estimation matrices.

The embodiments of the present disclosure provide a data processing apparatus. The processor determines the computation parallelism degree according to the number of antennas and the pilot frequency information, determines, according to the computation parallelism degree, the target antenna data processed in parallel by the arithmetic unit in the single computation, and processes the antenna data in parallel in the arithmetic unit, therefore the parallelism degree of data processing in the base station can be reduced, the occupation of computation resources by the processor is reduced, and the embodiments of the present disclosure have the characteristics of high parallelism degree and low delay, and meet the computation requirements of matrix computations.

In one embodiment, the processor 910 reads, from an external memory 940 in segments, the antenna data and weight data of the channel estimation matrices, and caches the antenna data and the weight data in the memory 920. The processor 910 determines, according to the computation parallelism degree, the number of resource elements of a single user acquired by the arithmetic unit 930 after the single computation, determines the target antenna data according to the number of resource elements, generates a data reading command based on the target antenna data, and sends the data reading command to the memory 920, so that the memory 920 outputs the target antenna data and value data corresponding to the target antenna data to the arithmetic unit 930, the arithmetic unit 930 reads, from the memory 920, the target antenna data and the corresponding weight data, computes user data, and writes the user data into the external memory 940 for caching, and the processor 910 can acquire the user data from the external memory 940.

In one embodiment, the processor includes:
  a first determination module, configured to determine a first reference computation parallelism degree according to the number of antennas;
  a second determination module, configured to determine a second reference computation parallelism degree according to the pilot frequency information; and
  a third determination module, configured to determine a smaller one of the first reference computation parallelism degree and the second reference computation parallelism degree as the computation parallelism degree.

In one embodiment, the second determination module is configured to:
  determine estimation accuracy of the channel estimation matrices according to the pilot frequency information, and determine the second reference computation parallelism degree according to the estimation accuracy.

In one embodiment, the estimation accuracy includes the number of weight data corresponding to each resource block of each user.

In one embodiment, the processor is configured to:
  read, in segments, the antenna data of the respective users and weight data in the channel estimation matrices according to a preset number of resource blocks; and
  group the antenna data and the weight data based on a preset grouping storage rule, and store the antenna data and the weight data in an associated manner in the memory based on a grouping result.

In one embodiment, the processor is configured to:
  determine, according to the computation parallelism degree, the number of resource elements of a single user acquired after the single computation of the arithmetic unit; and
  determine the target antenna data according to the number of resource elements, generate a data reading command based on the target antenna data, and send the data reading command to the memory, wherein the data reading command is used for instructing the memory to output the target antenna data and the weight data corresponding to the target antenna data to the arithmetic unit.

Figure 10:
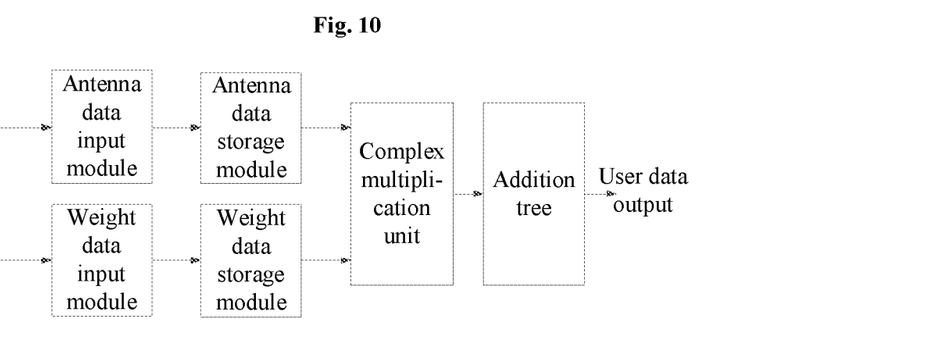
FIG. 10 is a structural block diagram of another data processing apparatus provided by the embodiments of the present disclosure.
Figure 11:
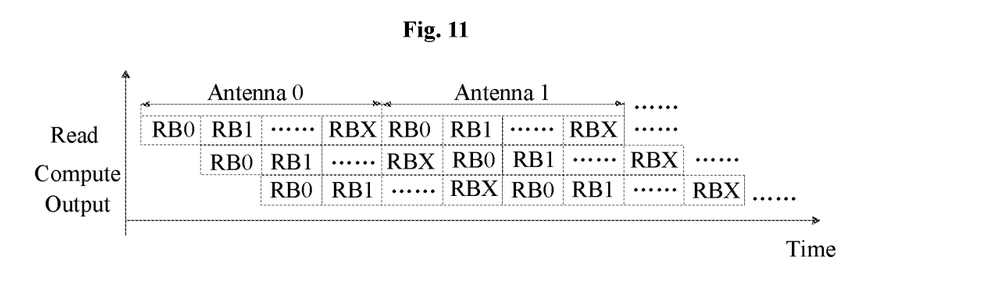
FIG. 11 is a schematic diagram of a computation flow provided by the embodiments of the present disclosure.

In one embodiment, FIG. 10 is a structural block diagram of another data processing apparatus provided by the embodiments of the present disclosure. As shown in FIG. 10, the data processing apparatus in the embodiment includes an antenna data input module 1001, a weight data input module 1002, an antenna data storage module 1003, a weight data storage module 1004, a complex multiplication unit 1005, and an addition tree 1006, wherein the complex multiplication unit is a complex multiplier group with 192 inputs. The addition tree is a 4×48 input adder group. The antenna data input module 1001 reads, from an external memory and according to the data format shown in FIG. 5, segmented antenna data of an antenna 0 (BLOCK is taken as an execution unit), then reads the segmented antenna data of an antenna 1, and performs iteration until the segmented antenna data for all antennas is read. The weight data input module 1002 reads weight data of all antennas of all users of $RB_0$, then reads the weight data of all antennas of all users of $RB_1$, and performs iteration until the weight data of all RBs in the current BLOCK is read. The next BLOCK is taken as the current BLOCK to execute the above operations. FIG. 11 is a schematic diagram of a computation flow provided by the embodiments of the present disclosure. As shown in FIG. 11, a horizontal axis represents time, a vertical axis represents an operation type, and the antenna data of each BLOCK of antennas such as the antenna 0 and the antenna 1 are sequentially read in a chronological order. For each BLOCK, the data is read in an order from $RB_0$ to $RB_x$.

According to the number of antennas, the read antenna data and the weight data are stored in groups. According to the computation parallelism degree (for example, for 1-32 antennas, 6 REs of a single user are computed in parallel very time; and for 33-64 antennas, 3 REs of a single user are computed in parallel very time), the antenna data and the weight data are respectively read from the memory, and are sent to the complex multiplication unit 1005 and the addition tree 1006 to perform matrix computation. For example, the RB data in the BLOCK of the user 0 is computed at first, then the RB data in the BLOCK of the user 1 is computed, and iteration is performed to compute the RB data in the BLOCKs of all users. The addition tree 1006 outputs all RB data in the BLOCK of each user.

The embodiments of the present disclosure provide a base station, including the data processing apparatus in the embodiments of the present disclosure. The base station provided above can be configured to execute the data processing method provided by any above embodiment, and has corresponding functions and beneficial effects.

An embodiment of the present disclosure further provides a storage medium for executable instructions, wherein when executed by a computer processor, the computer-executable instructions are configured to execute a data processing method, and the method includes: determining a computation parallelism degree according to the number of antennas and pilot frequency information; acquiring antenna data and channel estimation matrices of respective users, and storing the antenna data and the channel estimation matrices in groups; determining, according to the computation parallelism degree, target antenna data processed in parallel in a single computation, wherein the target antenna data is part of the antenna data of the respective users; and computing user data based on the target antenna data and the channel estimation matrices.

The above descriptions are merely exemplary embodiments of the present disclosure, and are not intended to limit the protection scope of the present disclosure.

In general, various embodiments of the present disclosure can be implemented in hardware or dedicated circuits, software, logic, or any combination thereof. For example, some aspects can be implemented in hardware, while other aspects can be implemented in firmware or software that can be executed by a controller, a microprocessor or other computing apparatuses, although the present disclosure is not limited thereto.

The block diagrams of any logic flow in the drawings of the present disclosure can represent program operations, or can represent interconnected logic circuits, modules and functions, or can represent a combination of program operations and logic circuits, modules and functions. Computer programs can be stored on a memory. The memory can be of any type suitable for a local technical environment and can be implemented by using any suitable data storage technology, such as, but is not limited to, a read only memory (ROM), a random access memory (RAM), optical memory apparatuses and systems (Digital Versatile Discs, DVD or CD discs) etc. The computer-readable medium may include a non-transitory storage medium. The data processor can be of any type suitable for the local technical environment, such as, but is not limited to, a general-purpose computer, a special-purpose computer, a microprocessor, a digital signal processor (DSP), an application-specific integrated circuit (ASIC), a programmable logic device (FGPA) and a processor based on multi-core processor architecture.

What is claimed is:

1. A data processing apparatus, comprising:
a processor, configured to determine a computation parallelism degree according to at least one of a quantity of antennas and pilot frequency information, acquire antenna data and channel estimation matrices of respective users, store the antenna data and the channel estimation matrices in groups in a memory, and determine, according to the computation parallelism degree, target antenna data processed in parallel by an arithmetic unit in a single computation, wherein the target antenna data is part of the antenna data of the respective users;
the memory, configured to store the antenna data and the channel estimation matrices in groups, and output the target antenna data and the channel estimation matrices to the arithmetic unit; and
the arithmetic unit, configured to compute user data based on the target antenna data and the channel estimation matrices.

2. The apparatus according to claim 1, wherein the processor is configured to:
determine a first reference computation parallelism degree according to the quantity of antennas;
determine a second reference computation parallelism degree according to the pilot frequency information; and
determine a smaller one of the first reference computation parallelism degree and the second reference computation parallelism degree as the computation parallelism degree.

3. The apparatus according to claim 2, wherein the processor is configured to:

determine estimation accuracy of the channel estimation matrices according to the pilot frequency information, and determine the second reference computation parallelism degree according to the estimation accuracy.

4. The apparatus according to claim 3, wherein the estimation accuracy comprises a quantity of weight data corresponding to each resource block of each user.

5. The apparatus according to claim 1, wherein the processor is configured to:
read, in segments, the antenna data of the respective users and weight data in the channel estimation matrices according to a preset number of resource blocks; and
group the antenna data and the weight data based on a preset grouping storage rule, and store the antenna data and the weight data in an associated manner based on a grouping result.

6. The apparatus according to claim 1, wherein the processor is configured to:
determine, according to the computation parallelism degree, a quantity of resource elements of a single user acquired after the single computation of the arithmetic unit; and
determine, according to the quantity of resource elements, the target antenna data processed in parallel by the arithmetic unit in the single computation.

7. The apparatus according to claim 1, wherein the processor is configured to:
determine estimation accuracy of the channel estimation matrices according to the pilot frequency information; and
determine the computation parallelism degree according to the estimation accuracy.

8. The apparatus according to claim 7, wherein the estimation accuracy comprises a quantity of weight data corresponding to each resource block of each user.

9. The apparatus according to claim 6, wherein the processor is further configured to generate a data reading command based on the target antenna data, and send the data reading command to the memory, wherein the data reading command is used for instructing the memory to output the target antenna data and weight data corresponding to the target antenna data to the arithmetic unit.

10. The apparatus according to claim 1, wherein the arithmetic unit comprises a complex multiplication unit and an addition tree.

11. A data processing method, comprising:
determining a computation parallelism degree according to at least one of a quantity of antennas and pilot frequency information;
acquiring antenna data and channel estimation matrices of respective users, and storing the antenna data and the channel estimation matrices in groups;
determining, according to the computation parallelism degree, target antenna data processed in parallel in a single computation, wherein the target antenna data is part of the antenna data of the respective users; and
computing user data based on the target antenna data and the channel estimation matrices.

12. The method according to claim 11, wherein determining the computation parallelism degree according to the quantity of antennas and the pilot frequency information comprises:
determining a first reference computation parallelism degree according to the quantity of antennas;
determining a second reference computation parallelism degree according to the pilot frequency information; and
determining a smaller one of the first reference computation parallelism degree and the second reference computation parallelism degree as the computation parallelism degree.

13. The method according to claim 12, wherein determining the second reference computation parallelism degree according to the pilot frequency information comprises:
determining estimation accuracy of the channel estimation matrices according to the pilot frequency information, and determining the second reference computation parallelism degree according to the estimation accuracy.

14. The method according to claim 13, wherein the estimation accuracy comprises a quantity of weight data corresponding to each resource block of each user.

15. The method according to claim 11, wherein acquiring the antenna data and the channel estimation matrices of the respective users, and storing the antenna data and the channel estimation matrices in groups comprises:
reading, in segments, the antenna data of the respective users and weight data in the channel estimation matrices according to a preset number of resource blocks; and
grouping the antenna data and the weight data based on a preset grouping storage rule, and storing the antenna data and the weight data in an associated manner based on a grouping result.

16. The method according to claim 11, wherein determining, according to the computation parallelism degree, the target antenna data processed in parallel in the single computation comprises:
determining, according to the computation parallelism degree, a quantity of resource elements of a single user acquired after the single computation; and
determining, according to the quantity of resource elements, the target antenna data processed in parallel in the single computation.

17. A non-transitory computer-readable storage medium, wherein computer programs are stored in the storage medium, and when executed by a processor, the computer programs implement the method according to claim 11.

18. The method according to claim 16, wherein after determining, according to the quantity of resource elements, the target antenna data processed in parallel in the single computation, the method further comprises:
generating a data reading command based on the target antenna data, and sending the data reading command to the memory, wherein the data reading command is used for instructing the memory to output the target antenna data and weight data corresponding to the target antenna data to the arithmetic unit.

19. The method according to claim 11, wherein determining the computation parallelism degree according to the pilot frequency information comprises:
determining estimation accuracy of the channel estimation matrices according to the pilot frequency information; and
determining the computation parallelism degree according to the estimation accuracy.

20. The method according to claim 19, wherein the estimation accuracy comprises a quantity of weight data corresponding to each resource block of each user.

* * * * *